United States Patent
Kim et al.

(10) Patent No.: US 12,415,943 B2
(45) Date of Patent: Sep. 16, 2025

(54) ADHESIVE FILM, OPTICAL MEMBER COMPRISING SAME, AND OPTICAL DISPLAY DEVICE COMPRISING SAME

(71) Applicant: SAMSUNG SDI CO., LTD., Yongin-si (KR)

(72) Inventors: Do Young Kim, Suwon-si (KR); Ji Yeon Kim, Suwon-si (KR); Sung Hyun Mun, Suwon-si (KR); Dong Myeong Shin, Suwon-si (KR); Gwang Hwan Lee, Suwon-si (KR); Il Jin Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 492 days.

(21) Appl. No.: 17/998,780

(22) PCT Filed: May 13, 2021

(86) PCT No.: PCT/KR2021/006021
§ 371 (c)(1),
(2) Date: Nov. 14, 2022

(87) PCT Pub. No.: WO2021/235771
PCT Pub. Date: Nov. 25, 2021

(65) Prior Publication Data
US 2023/0159802 A1 May 25, 2023

(30) Foreign Application Priority Data

May 21, 2020 (KR) ......................... 10-2020-0061197

(51) Int. Cl.
*C09J 11/04* (2006.01)
*C09J 11/06* (2006.01)
*C09J 133/10* (2006.01)

(52) U.S. Cl.
CPC ............ *C09J 133/10* (2013.01); *C09J 11/04* (2013.01); *C09J 11/06* (2013.01); *C09J 2301/312* (2020.08); *C09J 2301/408* (2020.08); *C09J 2301/414* (2020.08); *Y10T 428/2887* (2015.01); *Y10T 428/2891* (2015.01)

(58) Field of Classification Search
None
See application file for complete search history.

(56) References Cited

U.S. PATENT DOCUMENTS

| | | | |
|---|---|---|---|
| 2012/0064336 A1* | 3/2012 | Tanaka | C09J 4/06 977/773 |
| 2016/0177147 A1 | 6/2016 | Han et al. | |
| 2019/0211234 A1* | 7/2019 | Yamasaki | H05B 33/02 |

FOREIGN PATENT DOCUMENTS

| | | |
|---|---|---|
| CN | 110396370 A | 11/2019 |
| JP | 2015-081288 A | 4/2015 |
| JP | 2017-014376 A | 1/2017 |
| JP | 2019-218513 A | 12/2019 |
| KR | 10-2007-0055363 A | 5/2007 |
| KR | 10-2014-0090737 A | 7/2014 |
| KR | 10-2016-0045199 A | 4/2016 |
| KR | 10-2016-0076977 A | 7/2016 |
| KR | 10-2016-0135023 A | 11/2016 |
| KR | 10-2017-0114642 A | 10/2017 |

OTHER PUBLICATIONS

Chinese Office Action dated Jul. 26, 2023 issued in corresponding Chinese Patent Application No. 202180036577.6 (7 pages).
Yu Shouwu, et al., "Modification of Polymer Materials—Principle and Technology", pp. 178-179, May 31, 2015 (7 pages, including English translation).
Cheng Zhaorui, et al., "Plastic Bonding Technical Manual", p. 25, Jun. 30, 1992 (5 pages, including English translation).
International Search Report of PCT/KR2021/006021, Aug. 19, 2021, 6 pages.

* cited by examiner

*Primary Examiner* — Anish P Desai
(74) *Attorney, Agent, or Firm* — Womble Bond Dickinson (US) LLP

(57) ABSTRACT

Provided are an adhesive film, an optical member comprising same, and an optical display device comprising same, the adhesive film being formed of a composition comprising a hydroxyl group-containing (meth)acrylic copolymer and particles having a refractive index of about 1.5 or greater, wherein the adhesive film has a refractive index of about 1.5 or greater, and the adhesive film satisfies expression 1 and expression 2.

14 Claims, No Drawings

ADHESIVE FILM, OPTICAL MEMBER COMPRISING SAME, AND OPTICAL DISPLAY DEVICE COMPRISING SAME

CROSS-REFERENCE TO RELATED APPLICATIONS

This application is a U.S. National Phase Patent Application of International Application Number PCT/KR2021/006021, filed on May 13, 2021, which claims priority to Korean Patent Application Number 10-2020-0061197, filed on May 21, 2020, the entire content of each of which is incorporated herein by reference.

TECHNICAL FIELD

The present invention relates to an adhesive film, an optical member comprising the same, and an optical display device comprising the same.

BACKGROUND ART

An optical display device includes display elements. In general, the optical elements may be stacked one above another via an acrylic adhesive film. The optical elements may include various optical films, such as a touchscreen panel, a polarizing plate, and the like.

There is a great difference in index of refraction between the touchscreen panel and the acrylic adhesive film. Such a difference in index of refraction can affect screen quality. Accordingly, there is a method of adding an adhesive film including a high refractivity layer or an optical film comprising the same between the touchscreen panel and the acrylic adhesive film to relieve the difference in index of refraction therebetween. However, a separate adhesive film including a high refractivity layer or an optical film including the high refractivity layer can cause increase in thickness of an optical display device and requires an additional process causing deterioration in processability and economic feasibility.

Accordingly, a method of increasing the index of refraction of the acrylic adhesive film is considered. However, an acrylic adhesive film having a high index of refraction can cause deterioration in peel strength and optical characteristics including haze and the like. On the other hand, with recent development of foldable displays, the foldable displays require foldability.

The background technique of the present invention is disclosed in Korean Patent Laid-open Publication No. 10-2007-0055363 and the like.

DISCLOSURE

Technical Problem

It is one aspect of the present invention to provide an adhesive film that has a high index of refraction and high peel strength.

It is another aspect of the present invention to provide an adhesive film that has good foldability at each of low temperature and high temperature.

It is a further aspect of the present invention to provide an adhesive film that has a thin thickness and low haze to secure good optical characteristics.

Technical Solution

One aspect of the present invention relates to an adhesive film.

1. The adhesive film is formed of a composition including a hydroxyl group-containing (meth)acrylic copolymer and inorganic particles having an index of refraction of about 1.5 or more, and the adhesive film has an index of refraction of about 1.5 or more, and satisfies the following Relations 1 and 2:

$$PS/G(@-20° C.) \geq 0.6,$$ [Relation 1]

where PS is peel strength of the adhesive film at 25° C. (unit: gf/inch), and
G(@-20° C.) is modulus of the adhesive film at -20° C. (unit: kPa).

$$PS/G(@60° C.) \leq 150,$$ [Relation 2]

where PS is peel strength of the adhesive film at 25° C. (unit: gf/inch), and
G(@60° C.) is modulus of the adhesive film at 60° C. (unit: kPa).

2. In 1, the adhesive film may have a peel strength of about 500 gf/inch or more at 25° C.

3. In 1 and 2, the adhesive film may have a modulus of about 50 kPa to about 1,000 kPa at -20° C. and a modulus of about 10 kPa to about 500 kPa at 60° C.

4. In 1 to 3, the adhesive film may have a modulus ratio of modulus at -20° C.:modulus at 60° C. of about 1:0.01 to about 1:500.

5. In 1 to 4, the adhesive film may have a thickness of about 15 µm or less.

6. In 1 to 5, the hydroxyl group-containing (meth)acrylic copolymer may include a copolymer of a monomer mixture including a hydroxyl group-containing (meth)acrylic monomer, an alkyl group-containing (meth)acrylic monomer, and a hetero alicyclic group-containing (meth)acrylic monomer.

7. In 6, the monomer mixture may include about 5 wt % to about 20 wt % of the hydroxyl group-containing (meth)acrylic monomer, about 60 wt % to about 90 wt % of the alkyl group-containing (meth)acrylic monomer, and about 1 wt % to about 20 wt % of the hetero alicyclic group group-containing (meth)acrylic monomer.

8. In 1 to 7, the inorganic particles having an index of refraction of about 1.5 or more may include zirconia.

9. In 1 to 8, the inorganic particles having an index of refraction of about 1.5 or more may be present in an amount of about 1 wt % to about 10 wt % in the adhesive film.

10. In 1 to 9, the composition may include an isocyanate type crosslinking agent.

11. In 10, the isocyanate type crosslinking agent may include a bi- or higher functional isocyanate type crosslinking agent containing a linear aliphatic group.

12. In 10, the isocyanate type crosslinking agent may be present in an amount of about 0.05 parts by weight to less than about 2.0 parts by weight relative to 100 parts by weight of the hydroxyl group-containing (meth)acrylic copolymer.

Another aspect of the present invention relates to an optical member including an adherend for optical display devices; and the adhesive film according to the present invention formed on one surface of the adherend.

A further aspect of the present invention relates to an optical display device including the adhesive film or the optical member according to the present invention.

Advantageous Effects

The present invention provides an adhesive film that has a high index of refraction and high peel strength.

The present invention provides an adhesive film that has good foldability at each of low temperature and high temperature.

The present invention provides an adhesive film that has a thin thickness and low haze to secure good optical characteristics.

BEST MODE

Hereinafter, embodiments of the present invention will be described in detail so as to be easily implemented by a person having ordinary knowledge in the art. It should be understood that the present invention may be realized in various ways and is not limited to the following embodiments.

Herein, "(meth)acryl" may mean acryl and/or methacryl. In addition, "copolymer" may include an oligomer, a polymer or a resin.

Herein, "adherend" may mean not only a glass plate but also a plastic film formed of a polyimide resin, an acryl resin or a touchscreen panel and the like.

In one embodiment, the adherend may be a glass plate, preferably an alkali-free glass plate or a touchscreen panel. Preferably, the glass plate has a functional coating layer, for example, an anti-fingerprint layer, an antireflection layer, an antiglare layer, and the like, on a surface thereof to which an adhesive layer will be attached. The touchscreen panel may include an electrically conductive film containing ITO or metal nanowires.

The inventors of the present invention developed an adhesive film that has a high index of refraction, high peel strength, good foldability at each of low temperature and high temperature, a thin thickness, and low haze to secure good optical characteristics.

In one embodiment, the adhesive film may have a haze of about 1% or less, for example, 0% to about 1%, in the visible spectrum (e.g.: a wavelength of 380 nm to 780 nm). Within this range, the adhesive film can be used in an optical display device. Haze may be measured by a typical method well-known to those skilled in the art.

Hereinafter, an adhesive film according to one embodiment of the invention will be described.

The adhesive film according to the embodiment is formed of a composition including a hydroxyl group-containing (meth)acrylic copolymer and inorganic particles having an index of refraction of about 1.5 or more. The adhesive film according to the embodiment can secure an index of refraction of about 1.5 or more, thereby preventing deterioration in screen quality due to a difference in index of refraction when stacked on an adherend having a high index of refraction. In some embodiments, the adhesive film may have an index of refraction of about 1.5 to about 1.7.

The hydroxyl group-containing (meth)acrylic copolymer forms a matrix of the adhesive film and can assist in improvement in peel strength of the adhesive film through reaction with a heat curable crosslinking agent described below.

The hydroxyl group-containing (meth)acrylic copolymer may be a carboxylic acid-free copolymer that does not contain a carboxylic acid group. When the hydroxyl group-containing (meth)acrylic copolymer contains a carboxylic acid group, the adhesive film can cause damage to an adherend, for example, a touchscreen panel, or can fail to realize the effects of the present invention.

The hydroxyl group-containing (meth)acrylic copolymer may include a copolymer of a monomer mixture including a hydroxyl group-containing (meth)acrylic monomer, an alkyl group-containing (meth)acrylic monomer and a hetero alicyclic group group-containing (meth)acrylic monomer.

In the present invention, in order to improve the index of refraction of the adhesive film, the inorganic particles having an index of refraction of about 1.5 or more described below are used in the adhesive film instead of the aromatic group-containing (meth)acrylic monomer. When the monomer mixture includes the aromatic group-containing (meth)acrylic monomer instead of the inorganic particles having an index of refraction of about 1.5 or more, there can be a problem of deterioration in light resistance. Here, "light resistance" means a possibility of discoloration or change of color of the adhesive film under a light source, such as a Xenon lamp, UV-A, UV-B, and/or UV-C.

The hydroxyl group-containing (meth)acrylic monomer may impart peel strength to the adhesive film. The hydroxyl group-containing (meth)acrylic monomer may include a (meth)acrylate containing at least one hydroxyl group. For example, the hydroxyl group-containing (meth)acrylate may include a (meth)acrylate containing a $C_2$ to $C_{10}$ alkyl group having at least one hydroxyl group. Specifically, the hydroxyl group-containing (meth)acrylate may include at least one selected from among 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, and 6-hydroxyhexyl (meth)acrylate. Preferably, the hydroxyl group-containing (meth)acrylate includes at least one selected from among 4-hydroxybutyl (meth)acrylate, 2-hydroxyethyl (meth)acrylate, 6-hydroxyhexyl(meth)acrylate, and 3-hydroxypropyl(meth)acrylate.

In the monomer mixture, the hydroxyl group-containing (meth)acrylic monomer may be present in an amount of about 5 wt % to about 20 wt %, specifically about 5 wt % to about 15 wt %, for example, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, or 20 wt %. Within this range, the adhesive film an achieve improvement in peel strength with respect to an adherend.

The alkyl group-containing (meth)acrylic monomer forms a matrix of the adhesive film. The alkyl group-containing (meth)acrylic monomer may include an unsubstituted $C_1$ to $C_{20}$ linear or branched alkyl group-containing (meth)acrylate. For example, the alkyl group-containing (meth)acrylate may include at least one selected from among methyl (meth)acrylate, ethyl (meth)acrylate, propyl (meth)acrylate, n-butyl (meth)acrylate, t-butyl (meth)acrylate, iso-butyl (meth)acrylate, pentyl (meth)acrylate, hexyl (meth)acrylate, heptyl (meth)acrylate, ethyl hexyl (meth)acrylate including 2-ethylhexyl (meth)acrylate and the like, octyl (meth)acrylate, isooctyl (meth)acrylate, nonyl (meth)acrylate, decyl (meth)acrylate, and lauryl (meth)acrylate.

In the monomer mixture, the alkyl group-containing (meth)acrylic monomer may be present in an amount of about 60 wt % to about 90 wt %, specifically about 65 wt % to about 90 wt %, for example, 60 wt %, 61 wt %, 62 wt %, 63 wt %, 64 wt %, 65 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, or 90 wt %. Within this range, the adhesive film can be formed by curing.

The hetero alicyclic group group-containing (meth)acrylic monomer will be described below.

The hydroxyl group-containing (meth)acrylic copolymer may include a copolymer of a ternary monomer mixture consisting of a hydroxyl group-containing (meth)acrylic monomer, an alkyl group-containing (meth)acrylic monomer, and a hetero alicyclic group group-containing (meth)acrylic monomer, or a copolymer of a monomer mixture obtained by further adding a comonomer to the ternary monomer mixture. The comonomer may be selected from typical comonomers well-known to those skilled in the art.

The hydroxyl group-containing (meth)acrylic monomer may have a weight average molecular weight of about 500,000 to about 4,000,000, preferably about 500,000 to about 2,000,000. Within this range, the adhesive film can easily realize the effects of the present invention.

The hydroxyl group-containing (meth)acrylic monomer may be prepared through polymerization of the monomer mixture by a typical method well-known to those skilled in the art. Polymerization may be carried out by a typical method well-known to those skilled in the art.

The inorganic particles having an index of refraction of about 1.5 or more increase the index of refraction of the adhesive film to allow the adhesive film to reach an index of refraction according to the present invention.

The inorganic particles having an index of refraction of about 1.5 or more preferably has an index of refraction of about 1.5 to about 2.8, more preferably about 1.5 to about 1.7. Within this range, the adhesive film can easily reach an index of refraction according to the present invention.

The inorganic particles having an index of refraction of about 1.5 or more may be selected from typical inorganic particles well-known to those skilled in the art. For example, the inorganic particles having an index of refraction of about 1.5 or more may include at least one selected from among zirconia ($ZrO_2$) and titania ($TiO_2$). Preferably, the inorganic particles having an index of refraction of about 1.5 or more include zirconia. Zirconia has better light resistance than titania to improve light resistance of the adhesive film. "Light resistance" is the same as described above.

The inorganic particles having an index of refraction of about 1.5 or more may have an average particle diameter (D50) of about 10 nm to about 50 nm, specifically about 20 nm to about 30 nm, for example, 10 nm, 15 nm, 20 nm, 25 nm, 30 nm, 35 nm, 40 nm, 45 nm, or 50 nm. Within this range, the inorganic particles can be applied to the adhesive film without affecting peel strength and foldability of the adhesive film.

The average particle diameter (D50) may be measured by a typical method well-known to those skilled in the art. For example, "average particle diameter (D50)" refers to a particle diameter corresponding to 50% by weight in a weight cumulative distribution of abrasive particles.

The inorganic particles having an index of refraction of about 1.5 or more may be present in an amount of about 1 wt % to about 10 wt %, specifically about 4 wt % to about 10 wt %, for example, 1 wt %, 2 wt %, 3 wt %, 4 wt %, 5 wt %, 6 wt %, 7 wt %, 8 wt %, 9 wt %, or 10 wt %, in the adhesive film. Within this range, the adhesive film can secure an index of refraction of 1.5 or more and can achieve improvement in peel strength and foldability at high and low temperatures.

Relative to 100 parts by weight of the hydroxyl group-containing (meth)acrylic copolymer or the monomer mixture therefor, the inorganic particles having an index of refraction of about 1.5 or more may be present in an amount of about 0.1 parts by weight to about 50 parts by weight, specifically about 0.1 parts by weight to about 30 parts by weight, about 0.1 parts by weight to about 20 parts by weight, about 0.1 parts by weight to about 10 parts by weight, about 1 parts by weight to about 10 parts by weight, for example, 0.1, 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 parts by weight. Within this range, the adhesive film can secure an index of refraction of 1.5 or more and can achieve improvement in peel strength and foldability at high and low temperatures.

On the other hand, an adhesive film having a high index of refraction is likely to exhibit low peel strength. The present invention is aimed at providing an adhesive film having a thin thickness and a peel strength of about 500 gf/inch or more while securing a high index of refraction. Specifically, the adhesive film according to the present invention may have a peel strength of about 500 gf/inch to about 2,000 gf/inch, for example, 600 gf/inch, 700 gf/inch, 800 gf/inch, 900 gf/inch, 1,000 gf/inch, 1,100 gf/inch, 1,200 gf/inch, 1,300 gf/inch, 1,400 gf/inch, 1,500 gf/inch, 1,600 gf/inch, 1,700 gf/inch, 1,800 gf/inch, 1,900 gf/inch, or 2,000 gf/inch. Within this range, the adhesive film can exhibit good peel strength with respect to an optical element to improve reliability of a display device. The "peel strength" may be measured with reference to a method described in an experimental example described below.

The adhesive film may have a thickness of about 15 μm or less, specifically greater than about 0 μm to about 15 μm, more specifically about 5 μm to about 15 μm. Within this range, the adhesive film can realize reduction in thickness of an optical display device.

Thus, according to the present invention, the monomer mixture include the hetero alicyclic group group-containing (meth)acrylic monomer.

The hetero alicyclic group group-containing (meth)acrylic monomer can assist in improvement in peel strength of the adhesive film together with the inorganic particles having an index of refraction of about 1.5 or more. The hetero alicyclic group group-containing (meth)acrylic monomer may have a glass transition temperature of about 10° C. to about 200° C., preferably about 30° C. to about 180° C., for example, 10° C., 20° C., 30° C., 40° C., 50° C., 60° C., 70° C., 80° C., 90° C., 100° C., 110° C., 120° C., 130° C., 140° C., 150° C., 160° C., 170° C., 180° C., 190° C., or 200° C., in a homopolymer phase. Within this range, the adhesive film can have high peel strength.

The hetero alicyclic group group-containing (meth)acrylic monomer may include at least one selected from among N-(meth)acryloylmorpholine and N-(meth)acryloylpyrrolidone. Preferably, the hetero alicyclic group group-containing (meth)acrylic monomer contains a morpholinyl group and may include N-(meth)acryloylmorpholine to improve peel strength at room temperature.

In the monomer mixture, the hetero alicyclic group group-containing (meth)acrylic monomer may be present in an amount of about 1 wt % to about 20 wt %, preferably about 1 wt % to about 15 wt %, more preferably about 1 wt % to about 10 wt %, for example, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, or 20 wt %. Within this range, the adhesive film can exhibit good peel strength and flexibility at low temperature and high temperature.

In addition, the present invention is aimed at improving foldability of the adhesive film at each of low temperature and high temperature while securing good peel strength of the adhesive film. Improvement in peel strength of the adhesive film can be achieved through reduction in degree of cure of the adhesive film or through addition of a tackifier. In this case, however, the adhesive film can suffer from deterioration in folding properties.

According to the present invention, the adhesive film includes the inorganic particles having an index of refraction of about 1.5 or more and satisfies the following Relations 1 and 2.

$$PS/G(@-20° C.) \geq 0.6, \quad \text{[Relation 1]}$$

where PS is peel strength of the adhesive film at 25° C. (unit: gf/inch), and
G(@−20° C.) is modulus of the adhesive film at −20° C. (unit: kPa).

$$PS/G(@60° C.) \leq 150, \quad \text{[Relation 2]}$$

where PS is peel strength of the adhesive film at 25° C. (unit: gf/inch), and
G(@60° C.) is modulus of the adhesive film at 60° C. (unit: kPa).

By satisfying Relations 1 and 2, the adhesive film having a high index of refraction can exhibit good foldability at low temperature and high temperature while securing good peel strength.

In one embodiment, the adhesive film may have a PS/G (@−20° C.) value of about 0.6 to about 30, specifically about 0.6 to about 20, about 0.6 to about 15, about 0.6 to about 10, about 0.6 to about 9, about 0.6 to about 8, about 0.6 to about 7, about 0.6 to about 6, about 0.6 to about 5, about 0.6 to about 4, about 0.6 to about 3, or 0.6 to 2, for example, 0.6, 0.7, 0.8, 0.9, 1.0, 1.1, 1.2, 1.3, 1.4, 1.5, 1.6, 1.7, 1.8, 1.9, 2, 3, 4, 5, 6, 7, 8, 9, 10, 11, 12, 13, 14, 15, 16, 17, 18, 19, 20, 21, 22, 23, 24, 25, 26, 27, 28, 29, or 30.

In one embodiment, the adhesive film may have a PS/G (@60° C.) value of about 1.0 to about 150, specifically about 2.0 to about 100, about 3.0 to about 90, about 4.0 to about 80, about 5.0 to about 70, about 5.0 to about 60, about 5 to about 50, or about 5 to about 40, for example, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 80, 90, 100, 110, 120, 130, 140, or 150.

The adhesive film may have a modulus at −20° C. of about 50 kPa to about 1,000 kPa, specifically about 100 kPa to about 1,000 kPa, about 200 kPa to about 1,000 kPa, about 300 kPa to about 1,000 kPa, about 400 kPa to about 1,000 kPa, or about 500 kPa to about 1,000 kPa, for example, 50 kPa, 100 kPa, 150 kPa, 200 kPa, 250 kPa, 300 kPa, 350 kPa, 400 kPa, 450 kPa, 500 kPa, 550 kPa, 600 kPa, 650 kPa, 700 kPa, 750 kPa, 800 kPa, 850 kPa, 900 kPa, 950 kPa, or 1,000 kPa. Within this range, the adhesive film can easily satisfy Relation 1 while securing improvement in foldability at low temperature.

The adhesive film may have a modulus at 60° C. of about 10 kPa to about 500 kPa, specifically about 10 kPa to about 300 kPa, about 10 kPa to about 200 kPa, about 10 kPa to about 150 kPa, or about 10 kPa to about 100 kPa, for example, 10 kPa, 20 kPa, 30 kPa, 40 kPa, 50 kPa, 60 kPa, 70 kPa, 80 kPa, 90 kPa, 100 kPa, 110 kPa, 120 kPa, 130 kPa, 140 kPa, 150 kPa, 160 kPa, 170 kPa, 180 kPa, 190 kPa, 200 kPa, 210 kPa, 210 kPa, 220 kPa, 230 kPa, 240 kPa, 250 kPa, 260 kPa, 270 kPa, 280 kPa, 290 kPa, 300 kPa, 310 kPa, 320 kPa, 330 kPa, 340 kPa, 350 kPa, 360 kPa, 370 kPa, 380 kPa, 390 kPa, 400 kPa, 410 kPa, 420 kPa, 430 kPa, 440 kPa, 450 kPa, 460 kPa, 470 kPa, 480 kPa, 490 kPa, or 500 kPa. Within this range, the adhesive film can easily satisfy Relation 2 and can exhibit improved foldability at low temperature.

The adhesive film may have a modulus ratio of about 1:0.01 to about 1:500 (modulus at −20° C.:modulus at 60° C.), specifically about 1:0.01 to about 1:100, about 1:0.01 to about 1:10, about 1:0.01 to about 1:5, or 1:0.01 to about 1:1, for example, 1:0.02, 1:0.03, 1:0.04, 1:0.05, 1:0.06, 1:0.07, 1:0.08, 1:0.09, 1:0.1, 1:0.2, 1:0.3, 1:0.4, 1:0.5, 1:0.9, or 1:1. Within this range, the adhesive film can achieve improvement in foldability at low temperature and high temperature.

The adhesive film can satisfy Relations 1 and 2 by controlling a heat curable crosslinking agent while adding the hetero alicyclic group group-containing (meth)acrylic monomer thereto.

The heat curable crosslinking agent can impart peel strength to the adhesive film through heat curing of the hydroxyl group-containing (meth)acrylic copolymer.

The heat curable crosslinking agent may include an isocyanate type crosslinking agent. The isocyanate type crosslinking agent serves to improve peel strength and to impart cohesive strength to improve foldability at low temperature and high temperature through reaction with the hydroxyl group in the hydroxyl group-containing (meth) acrylic copolymer.

The isocyanate type crosslinking agent may include a bi- or higher functional, for example, a bi- to hexa-functional, isocyanate type crosslinking agent. Preferably, the isocyanate type crosslinking agent includes an isocyanate type crosslinking agent containing a linear aliphatic group, such as hexamethylene diisocyanate, pentamethylene diisocyanate, and the like. The isocyanate type crosslinking agent containing a linear aliphatic group, such as hexamethylene diisocyanate, pentamethylene diisocyanate, and the like, can impart flexibility through the linear aliphatic group while improving foldability of the adhesive film through reduction in modulus of the adhesive film.

The content of the heat curable crosslinking agent, for example, the content of the isocyanate type crosslinking agent, is controlled depending upon the content of the hydroxyl group-containing (meth)acrylate in the hydroxyl group-containing (meth)acrylic copolymer. The isocyanate type crosslinking agent can assist in improvement in foldability of the adhesive film at low temperature and high temperature. The heat curable crosslinking agent may be present in an amount of about 0.05 parts by weight to less than about 2.0 parts by weight relative to 100 parts by weight of the hydroxyl group-containing (meth)acrylic copolymer or the monomer mixture therefor. Within this range, the adhesive film can achieve improvement in peel strength and foldability at low temperature and high temperature. Preferably, the heat curable crosslinking agent may be present in an amount of about 0.05 parts by weight to about 1.5 parts by weight, about 0.05 parts by weight to about 1.0 parts by weight, about 0.05 parts by weight to about 0.5 parts by weight, or about 0.05 parts by weight to about 0.15 parts by weight relative to 100 parts by weight of the hydroxyl group-containing (meth)acrylic copolymer or the monomer mixture therefor.

The composition may further include a silane coupling agent. The silane coupling agent can improve peel strength of the adhesive film with respect to an adherend. The silane coupling agent may include a typical silane coupling agent well-known to those skilled in the art. The silane coupling agent may be present in an amount of about 0.001 parts by weight to about 1 part by weight, specifically about 0.003 parts by weight to about 1 part by weight, more specifically about 0.005 parts by weight to about 1 part by weight, relative to 100 parts by weight of the hydroxyl group-containing (meth)acrylic copolymer or the monomer mixture therefor.

The composition may further include typical additives, such as antistatic agents, surfactants, curing accelerators, ionic liquids, lithium salts, inorganic fillers, softeners, molecular weight regulators, antioxidants, anti-aging agents, stabilizers, tackifiers, modifying resins (polyol resins, phenolic resins, acrylic resins, polyester resin, polyolefin resin, epoxy resin, epoxidized polybutadiene resin, and the like), leveling agent, defoaming agent, plasticizer, dyes, pigments (coloring pigments, extender pigments, and the like), processing agents, sunscreen agents, fluorescent whitening agents, dispersing agents, heat stabilizers, light stabilizers, ultraviolet absorbers, coagulants, and lubricants. The additives may be present in an amount of 0.001 parts by weight to 1 part by weight, specifically 0.003 parts by weight to 1 part by weight, more specifically 0.005 parts by weight to 1 part by weight, relative to 100 parts by weight of the hydroxyl group-containing (meth)acrylic copolymer or the monomer mixture therefor. Within this range, the additives can provide inherent effects thereof without affecting peel strength and reliability of the adhesive film.

The composition may further include a solvent. The solvent may improve coatability of the composition. The solvent may be selected from typical solvents including methyl ethyl ketone and the like. The solvent may be present in the balance amount in the composition excluding solid content.

The adhesive film may be produced by coating the composition to a predetermined thickness on a base film, followed by heat curing. In one embodiment, the base film may include a polyester film, such as polyethylene terephthalate and the like, without being limited thereto. The base film may have a thickness of about 10 μm to about 100 μm, preferably about 50 μm to about 80 μm. In one embodiment, heat curing may be carried out by heat treatment at 50° C. to 120° C. for about 0.1 min to about 60 min.

Next, an optical member according to one embodiment of the invention will be described.

The optical member according to the embodiment may include an adherend for optical displays and an adhesive film formed on at least one surface of the adherend, in which the adhesive film may include the adhesive film according to the embodiments of the invention.

The adherend for optical displays may include not only the above adherend but also an optical film. In one embodiment, the optical film may include a window film, a window protective film, and the like, without being limited thereto.

Next, an optical display device according to one embodiment of the present invention will be described.

The optical display device according to the embodiment includes the adhesive film or the optical member according to the present invention. The optical display device may include a light emitting diode display, such as an organic light emitting diode display and the like, and a liquid crystal display, without being limited thereto. The optical display device may include a flexible device or a non-flexible device, without being limited thereto.

MODE FOR INVENTION

Next, the present invention will be described in more detail with reference to some examples. It should be understood that these examples are provided for illustration only and are not to be construed in any way as limiting the invention.

Example 1

A hydroxyl group-containing (meth)acrylic copolymer A (weight average molecular weight: 1,000,000) was prepared through polymerization of a monomer mixture prepared by mixing 81 parts by weight of 2-ethylhexyl acrylate, 14 parts by weight of 2-hydroxybutyl acrylate, and 5 parts by weight of acryloyl morpholine with ethyl acetate.

In terms of solid content, 0.05 parts by weight of a heat curable crosslinking agent (hexamethylene diisocyanate crosslinking agent, CK-102X, NCI) was added to 100 parts by weight of the prepared hydroxyl group-containing (meth)acrylic copolymer A. Next, a zirconia-containing sol (MA70, average zirconia particle diameter D(50): 20 nm, index of refraction of zirconia: 1.5, KC Tech Co., Ltd.) was further added thereto such that zirconia particles could be present in an amount of 5 parts by weight relative to 100 parts by weight of the hydroxyl group-containing (meth)acrylic copolymer in terms of solid content. A composition was prepared by sufficiently mixing these components.

An adhesive sheet including a 10 μm thick adhesive film on a base film was prepared by coating the composition to a thickness of 10 μm on one surface of a PET (polyethylene terephthalate) film (thickness: 75 μm, SKC) as the base film, followed by heat curing at 100° C. for 2 min.

Examples 2 to 4

Each adhesive sheet of a base film/adhesive film was prepared in the same manner as in Example 1 except that the components of the composition and/or the thickness of the adhesive film were changed as listed in Table 1 (unit: parts by weight).

Example 5

A hydroxyl group-containing (meth)acrylic copolymer B (weight average molecular weight: 1,000,000) was prepared through polymerization of a monomer mixture prepared by mixing 80 parts by weight of 2-ethylhexyl acrylate, 10 parts by weight of 2-hydroxybutyl acrylate, and 10 parts by weight of acryloyl morpholine with ethyl acetate.

An adhesive film was prepared in the same manner as in Example 1 using the hydroxyl group-containing (meth)acrylic copolymer B.

Example 6

An adhesive sheet of a base film/adhesive film was prepared in the same manner as in Example 1 except that the components of the composition and/or the thickness of the adhesive film were changed as listed in Table 1 (unit: parts by weight). Titania had an average particle diameter (D50) of 20 nm and an index of refraction of 2.4 to 2.6.

Comparative Examples 1 to 4

Each adhesive sheet of a base film/adhesive film was prepared in the same manner as in Example 1 except that the components of the composition and/or the thickness of the adhesive film were changed as listed in Table 1 (unit: parts by weight).

TABLE 1

| | Copolymer | | Crosslinking | High refractivity particles | | Thickness of |
|---|---|---|---|---|---|---|
| | Type | Content | agent | Type | Content | adhesive film |
| Example 1 | A | 100 | 0.05 | Zirconia | 5 | 10 |
| Example 2 | A | 100 | 0.05 | Zirconia | 10 | 10 |
| Example 3 | A | 100 | 0.1 | Zirconia | 5 | 10 |
| Example 4 | A | 100 | 0.05 | Zirconia | 5 | 15 |
| Example 5 | B | 100 | 0.05 | Zirconia | 5 | 10 |
| Example 6 | A | 100 | 0.05 | Titania | 5 | 10 |
| Comparative Example 1 | A | 100 | 0.05 | Zirconia | 15 | 10 |
| Comparative Example 2 | A | 100 | 0.05 | Zirconia | 0 | 10 |
| Comparative Example 3 | A | 100 | 0.01 | Zirconia | 5 | 10 |
| Comparative Example 4 | A | 100 | 2.00 | Zirconia | 5 | 10 |

The adhesive sheets prepared in Examples and Comparative Examples were evaluated as to the following properties of Table 2 and evaluation results are shown in Table 2.

(1) Peel strength (unit: gf/in): The adhesive sheet of the base film/adhesive layer prepared in each of Examples and Comparative Examples was cut into a rectangular piece having a size of width×length (2.5 cm×10 cm), which in turn was attached to an alkali-free glass plate to form a stack of the adhesive layer and the base film on the glass plate, thereby preparing a specimen. The specimen was attached to a TA (Texture Analyzer) Instrument, followed by measuring peel strength upon removal of the piece of the specimen from the alkali-free glass plate at an angle of 180° at 25° C. and at a peeling rate of 300 mm/min.

(2) Modulus (unit: MPa): Modulus was evaluated under temperature sweep conditions using an ARES rheometer (MCR-501, Anton Parr) as a dynamic viscoelasticity instrument. Plural adhesive films prepared in each of Examples and Comparative Examples were stacked to form a 400 μm thick stack. The stack was punched by an 8 mm diameter punching machine, thereby preparing a specimen. With a normal force of 1.0 N applied to the specimen using an 8 mm jig, storage modulus was measured at −20° C. and at 60° C. while increasing temperature from −60° C. to 90° C. at a rate of 5° C./min under conditions of a shear rate of 1 Hz and a strain of 1%.

(3) Relations 1 and 2: Values for Relations 1 and 2 were calculated from (1) and (2).

(4) Index of refraction: An adhesive film was obtained by removing the base film from each of the adhesive sheets prepared in Examples and Comparative Examples, followed by evaluation of an index of refraction of the adhesive film using a prism coupler.

(5) Foldability: A laminate was prepared by stacking a PET film (thickness: 50 μm), an adhesive layer (thickness: 10 μm or 15 μm in Example or Comparative Example) and a PET film (thickness: 50 μm), and was attached by a roller, followed by leaving the laminate at room temperature for 12 hours. Then, the laminate was cut into a specimen having a size of length×width (70 mm×140 mm), which in turn was secured to a flexibility tester (CFT-2000, Covotech Co., Ltd.) by an adhesive (4965, Tesa Co., Ltd.). Here, the PET film was subjected to corona treatment and the adhesive film was attached to one surface of the PET film subjected to corona treatment. The specimen was subjected to 100,000 cycles of folding in the width direction of the specimen at −20° C. or at 60° C. such that a bent portion of the specimen had a radius of curvature of 3 mm at a folding rate of 30 cycles per minute, where 1 cycle refers to an operation of folding the specimen to have the radius of curvature, maintaining the specimen in a folded state for 1 second, and unfolding the adhesive film back to 180°. After 100,000 cycles of folding, a specimen suffered from delamination, bubble generation, slight lifting or appearance deformation at any one temperature of −20° C. and 60° C. was rated as x and a specimen suffering from no delamination, bubble generation, slight lifting and appearance deformation at both at −20° C. and 60° C. was rated as ○.

TABLE 2

| | Peel | Modulus | | | | | Index of | Foldability | |
|---|---|---|---|---|---|---|---|---|---|
| | strength | @−20° C. | @60° C. | Ratio* | Relation 1 | Relation 2 | refraction | @−20° C. | @60° C. |
| Example 1 | 1,052 | 663 | 40.3 | 1:0.061 | 1.59 | 26.10 | 1.51 | ○ | ○ |
| Example 2 | 754 | 765 | 126.4 | 1:0.165 | 0.99 | 5.97 | 1.53 | ○ | ○ |
| Example 3 | 625 | 884 | 41.6 | 1:0.047 | 0.71 | 15.02 | 1.51 | ○ | ○ |
| Example 4 | 1,379 | 793 | 41.6 | 1:0.052 | 1.74 | 33.14 | 1.51 | ○ | ○ |
| Example 5 | 1,168 | 912 | 51.2 | 1:0.056 | 1.28 | 22.81 | 1.51 | ○ | ○ |
| Example 6 | 721 | 898 | 46.2 | 1:0.051 | 0.80 | 15.61 | 1.51 | ○ | ○ |
| Comparative Example 1 | 450 | 816 | 321.5 | 1:0.394 | 0.55 | 1.40 | 1.55 | x | ○ |
| Comparative Example 2 | 1,150 | 510 | 31 | 1:0.061 | 2.25 | 37.10 | 1.48 | ○ | ○ |
| Comparative Example 3 | 1,076 | 45.5 | 6.5 | 1:0.143 | 23.65 | 165.54 | 1.51 | ○ | x |
| Comparative Example 4 | 405 | 3,016 | 52 | 1:0.017 | 0.13 | 7.79 | 1.51 | x | ○ |

*In Table 2, the ratio: a ratio of modulus at −20° C. to modulus at 60° C.

As shown in Table 2, the adhesive films according to the present invention had thin thicknesses and high indexes of refraction while securing good peel strength and good foldability at low temperature and high temperature.

Conversely, the adhesive films of Comparative Examples not satisfying the present invention failed to achieve all of the effects of the present invention.

It should be understood that various modifications, changes, alterations, and equivalent embodiments can be made by those skilled in the art without departing from the spirit and scope of the invention.

The invention claimed is:

1. An adhesive film formed of a composition comprising a hydroxyl group-containing (meth)acrylic copolymer and inorganic particles having an index of refraction of about 1.5 or more, the adhesive film having an index of refraction of about 1.5 or more and satisfying Relations 1 and 2:

$$PS/G(@-20° C.) \geq 0.6, \qquad \text{[Relation 1]}$$

where PS is peel strength of the adhesive film at 25° C. (unit: gf/inch), and
G (@−20° C.) is modulus of the adhesive film at −20° C. (unit: kPa);

$$PS/G(@60° C.) \geq 150, \qquad \text{[Relation 2]}$$

where PS is peel strength of the adhesive film at 25° C. (unit: gf/inch), and
G (@60° C.) is modulus of the adhesive film at 60° C. (unit: kPa).

2. The adhesive film according to claim 1, wherein the adhesive film has a peel strength of about 500 gf/inch or more at 25° C.

3. The adhesive film according to claim 1, wherein the adhesive film has a modulus of about 50 kPa to about 1,000 kPa at −20° C. and a modulus of about 10 kPa to about 500 kPa at 60° C.

4. The adhesive film according to claim 1, wherein the adhesive film has a modulus ratio of modulus at −20° C.: modulus at 60° C. of about 1:0.01 to about 1:500.

5. The adhesive film according to claim 1, wherein the adhesive film has a thickness of about 15 μm or less.

6. The adhesive film according to claim 1, wherein the hydroxyl group-containing (meth)acrylic copolymer comprises a copolymer of a monomer mixture comprising a hydroxyl group-containing (meth)acrylic monomer, an alkyl group-containing (meth)acrylic monomer, and a hetero alicyclic group group-containing (meth)acrylic monomer.

7. The adhesive film according to claim 6, wherein the monomer mixture comprises about 5 wt % to about 20 wt % of the hydroxyl group-containing (meth)acrylic monomer, about 60 wt % to about 90 wt % of the alkyl group-containing (meth)acrylic monomer, and about 1 wt % to about 20 wt % of the hetero alicyclic group group-containing (meth)acrylic monomer.

8. The adhesive film according to claim 1, wherein the inorganic particles having an index of refraction of about 1.5 or more comprise zirconia.

9. The adhesive film according to claim 1, wherein the inorganic particles having an index of refraction of about 1.5 or more are present in an amount of about 1 wt % to about 10 wt % in the adhesive film.

10. The adhesive film according to claim 1, wherein the composition comprises an isocyanate crosslinking agent.

11. The adhesive film according to claim 10, wherein the isocyanate crosslinking agent comprises a bi-or higher functional isocyanate type crosslinking agent containing a linear aliphatic group.

12. The adhesive film according to claim 10, wherein the isocyanate crosslinking agent is present in an amount of about 0.05 parts by weight to less than about 2.0 parts by weight relative to 100 parts by weight of the hydroxyl group-containing (meth)acrylic copolymer.

13. An optical member comprising: an adherend for optical display devices; and the adhesive film according to claim 1 formed on one surface of the adherend.

14. An optical display device comprising the adhesive film according to claim 1.

* * * * *